F. ZALANKA.
SHOCK ABSORBER.
APPLICATION FILED JAN. 7, 1918.
1,270,582.
Patented June 25, 1918.
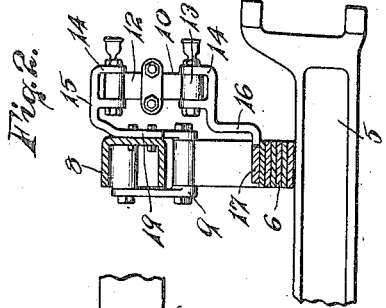
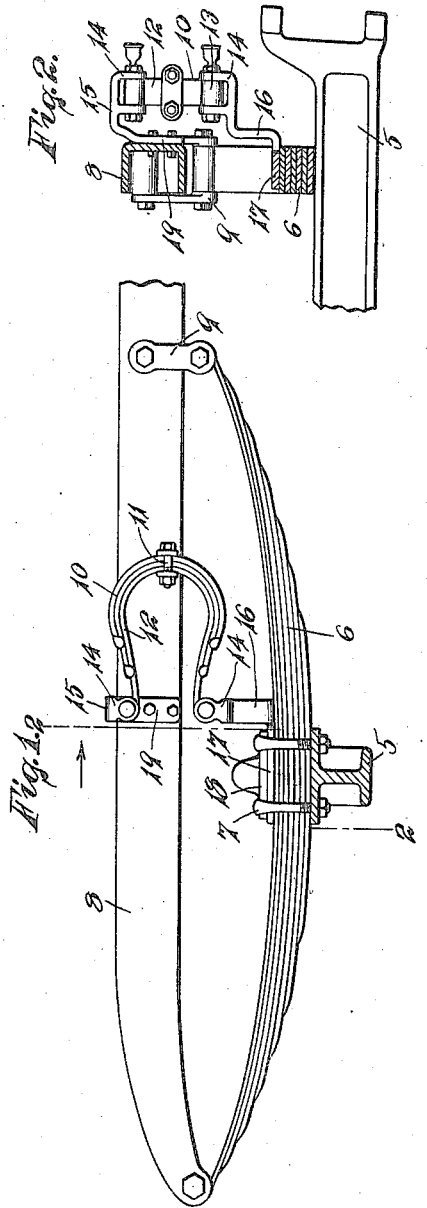
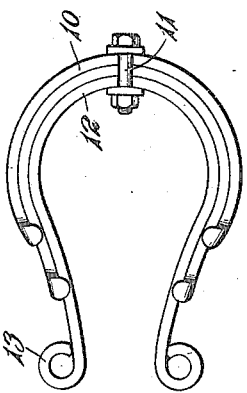
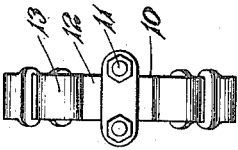
INVENTOR.
Frank Zalanka
BY
Arthur B Jenkins
ATTORNEY.

UNITED STATES PATENT OFFICE.

FRANK ZALANKA, OF HARTFORD, CONNECTICUT.

SHOCK-ABSORBER.

1,270,582.  Specification of Letters Patent.  Patented June 25, 1918.

Application filed January 7, 1918. Serial No. 210,640.

*To all whom it may concern:*

Be it known that I, FRANK ZALANKA, a subject of the Emperor of Austria and Hungary, and a resident of Hartford, in the county of Hartford and State of Connecticut, have invented a new and Improved Shock-Absorber, of which the following is a specification.

My invention relates to the class of devices used more especially in vehicle construction to minimize the effects of the sudden contact of the wheels with obstacles in the roadway, and an object of my invention, among others, is to provide a device of this class that shall be particularly efficient in its operation and durable in construction.

One form of device embodying my invention and in the construction and use of which the objects herein set out, as well as others, may be attained, is illustrated in the accompanying drawings, in which—

Figure 1 is a view of one end of a side frame member of a vehicle showing the axle and the spring secured thereto and attached to said frame member and with my improved absorber in place.

Fig. 2 is a view in cross section on plane denoted by dotted line 2—2 of Fig. 1.

Fig. 3 is an end view of my improved shock absorber.

Fig. 4 is a side view of the same.

In the accompanying drawings the numeral 5 indicates the axle of a vehicle, that may be of any desired form and constructed of any suitable material and that is properly shaped to receive a spring 6 that may also be of any suitable form, as herein shown this spring consisting of a number of leaves secured by clips 7 in a manner common to structures of this class. A side bar 8 of the vehicle frame is attached to the ends of the spring 6 in any suitable manner, as by means of eyes at each end of the spring through which bolts pass, one end being secured to a link 9. All of the parts thus far described are of old and well known construction and except in connection with parts to be hereinafter described form no part of my present invention.

My improved shock absorber is interposed between two members movable relatively one to the other and is constructed to retard separation of said members. It is, however, so positioned as to permit movement of said members one toward the other under contraction of the shock absorber, the resistance to separation of said members being due to the resisting qualities of the shock absorber to expansion. In the form of the invention shown herein my improved shock absorber 60 is preferably of C-shape and comprises a number of leaves 10, the longest of which is on the inside and the shortest of which is on the outside of the structure. They are secured together in any suitable manner to permit movement of the leaves relatively one to another, a spring clip 11 being shown herein as a means of securing the leaves together in a manner that will be readily understood. The longest and inner leaf 12 has eyes 13 at its opposite ends to receive bolts passing through members of the forked ends 14 of brackets 15—16, the former being secured to the side bar 8 and the latter having a base 17 in the form of a plate that is secured between a clamp plate 18 and the spring 6. The main part of the bracket 16 is off-set from the base 17 so that its forked end is located at one side of the plane of movement of the side bar and the spring, this forked end, however, being located in vertical alinement with the forked end of the bracket 15 which comprises a base plate 19 secured, as by means of screws or bolts, to the side of the side bar 8.

From this construction it will be noted that the shock absorber will yield quite readily to any force applied to the wheels of the vehicle in an upward direction, but will resist to a substantial degree any tendency of the frame, comprising side bars 8, to upward movement with a result that "bounding" action of the body of the vehicle is substantially reduced.

In accordance with the provisions of the patent statutes, I have described the principles of operation of my invention, together with the device which I now consider to represent the best embodiment thereof; but I desire to have it understood that the device shown is only illustrative, and that the invention may be carried out by other means.

I claim—

1. A supporting member, a member supported thereby, one of said parts having spring qualities, a shock absorbing member of C-shape composed of a plurality of leaves disposed and arranged to resist expansion to a greater degree than contraction whereby said supporting and supported members may approach each other from a certain position more readily than they may separate from such position, and means for securing the ends of said absorber to said supporting and supported members.

2. A supporting member, a member supported thereby, one of said parts having spring qualities, a shock absorbing member of C-shape composed of leaves of different lengths with the short length outside and the longer length on the inside, and means for securing the ends of said absorber to said supporting and supported members to resist separation of the latter.

FRANK ZALANKA.

Copies of this patent may be obtained for five cents each, by addressing the "Commissioner of Patents, Washington, D. C."